(12) United States Patent
Hayashi et al.

(10) Patent No.: US 9,933,331 B2
(45) Date of Patent: Apr. 3, 2018

(54) OPTICAL FIBER LEAKAGE LOSS MEASUREMENT METHOD

(71) Applicant: SUMITOMO ELECTRIC INDUSTRIES, LTD., Osaka-shi, Osaka (JP)

(72) Inventors: Tetsuya Hayashi, Yokohama (JP); Tetsuya Nakanishi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/697,815

(22) Filed: Sep. 7, 2017

(65) Prior Publication Data
US 2017/0363508 A1 Dec. 21, 2017

Related U.S. Application Data

(63) Continuation of application No. PCT/JP2015/084972, filed on Dec. 14, 2015.

(30) Foreign Application Priority Data

Mar. 30, 2015 (JP) ................................. 2015-067858

(51) Int. Cl.
G01M 11/00 (2006.01)
G02B 6/02 (2006.01)
G02B 6/44 (2006.01)

(52) U.S. Cl.
CPC .......... *G01M 11/33* (2013.01); *G01M 11/332* (2013.01); *G01M 11/335* (2013.01);
(Continued)

(58) Field of Classification Search
CPC .. G01M 11/0207; G01M 11/30; G01M 11/33; G01M 11/331; G01M 11/332;
(Continued)

(56) References Cited

U.S. PATENT DOCUMENTS

| 2009/0040508 A1* | 2/2009 | Hara ..................... G01M 11/35 356/73.1 |
| 2009/0274427 A1* | 11/2009 | Miyabe .............. G02B 6/02214 385/125 |

(Continued)

FOREIGN PATENT DOCUMENTS

JP        2009-150660 A    *    7/2009

OTHER PUBLICATIONS

T. Hayashi et al., "Design and fabrication of ultra-low crosstalk and low-loss multicore fiber", Opt. Express, vol. 19, No. 17, Aug. 2011, p. 16576-16592.

(Continued)

*Primary Examiner* — Gordon J Stock, Jr.
(74) *Attorney, Agent, or Firm* — Drinker Biddle & Reath LLP

(57) ABSTRACT

The present embodiment relates to a method of directly measuring a leakage loss from a peripheral core in a MCF with a coating to the coating. In the measurement method, in a high refractive-index state in which the coating is present on an outer periphery of a common cladding, first transmission power of measurement light, which propagates through the peripheral core of the MCF, is measured. On the other hand, in a low refractive-index state in which a low-refractive-index layer with a lower refractive index than the common cladding is provided on the outer periphery of the common cladding, second transmission power of the measurement light, which propagates through the peripheral core of the MCF, is measured. The leakage loss LL from the peripheral core to the coating is calculated as a difference between the first transmission power and the second transmission power.

6 Claims, 6 Drawing Sheets

(52) U.S. Cl.
CPC ......... *G02B 6/023* (2013.01); *G02B 6/02333* (2013.01); *G02B 6/4429* (2013.01)

(58) Field of Classification Search
CPC ............. G01M 11/333; G01M 11/334; G01M 11/335; G01M 11/336; G01M 11/337; G01M 11/338; G02B 6/023; G02B 6/02333; G02B 6/02338; G02B 6/02342; G02B 6/02357; G02B 6/02361; G02B 6/02366; G02B 6/02385; G02B 6/4429
USPC ........................................................ 356/73.1
See application file for complete search history.

(56) References Cited

U.S. PATENT DOCUMENTS

| 2012/0236295 | A1* | 9/2012 | Nakanishi | G01M 11/088 |
| | | | | 356/73.1 |
| 2013/0251320 | A1* | 9/2013 | Hayashi | G02B 6/02042 |
| | | | | 385/100 |
| 2015/0316714 | A1* | 11/2015 | Tsuchida | H01S 3/06737 |
| | | | | 385/127 |

OTHER PUBLICATIONS

K. Takenaga et al., "A Large Effective Area Multi-Core Fibre with an Optimised Cladding Thickness", Eur. Conf. Opt. Commun. (ECOC), Mo.1.LeCervin.2, 2011.
K. Takenaga et al., "A large effective area multi-core fiber with an optimized cladding thickness", Opt. Express, vol. 19, No. 26, Nov. 2011, p. B543-B550.

* cited by examiner

OPTICAL FIBER LEAKAGE LOSS MEASUREMENT METHOD

CROSS-REFERENCE TO RELATED APPLICATIONS

This application is a continuation application of PCT/JP2015/084972 claiming the benefit of priority of the Japanese Patent Application No. 2015-067858 filed on Mar. 30, 2015, the entire contents of which are incorporated herein by reference.

TECHNICAL FIELD

The present invention relates to a measurement method of a leakage loss from a core of an optical fiber, which includes a core comprised of silica-based glass, a cladding comprised of silica-based glass, and a resin coating, to the coating thereof.

BACKGROUND ART

According to below-described Non-Patent Documents, etc., it is known that, if the shortest distance (OCT: Outer Cladding Thickness) between a core center of a core (outermost core) positioned in an outermost and a cladding surface (coating) is short in the cross section perpendicular to a fiber axis of an optical fiber, particularly, a multi-core optical fiber (MCF), the leakage loss (LL) [dB/km] due to coupling of core-mode light from the core to the coating with a high refractive index.

In order to increase the utilization efficiency of the cross section of MCF, more cores are required to be packed. As an idea, it is conceivable to reduce the refractive index of the coating in order to suppress LL while OCT is reduced. In that case, a cladding mode is not sufficiently removed in the coating, and multi path interference (MPI), etc. due to re-coupling from the cladding mode to a core mode are easily generated. As a result, the signal quality of signal light, which propagates through the core, is deteriorated. In consideration of these, the coating is required to have a high refractive index at a certain level in order to achieve a predetermined MPI value and have a certain level of OCT in order to achieve a predetermined LL.

It has been described that the OCT required in core designing is 30 μm or more in Non-Patent Document 1 and is approximately more than 40 μm in Non-Patent Documents 2 and 3, and the required OCT is individually different depending on core structures and other structures. The level of LL has to be actually checked, and the measurement method thereof has been an indirect method which utilizes the excess loss (Excess Loss) shown in Non-Patent Documents 2 and 3.

In the left side of FIG. 1A, an example of MCF (cross-sectional structure of a MCF 10 orthogonal to a fiber central axis AX) is shown. The MCF 10 has a common cladding 4 comprised of silica-glass, and outermost cores (peripheral cores) 1 are circularly arranged at equal intervals about a central axis of a central axis of the common cladding 4, which is a fiber central axis AX. On an outer periphery of the common cladding 4, a coating 5 of a high-refractive-index resin is provided. In the example of FIG. 1A, as an option, as well as the structure disclosed in Non-Patent Document 2, an internal cladding 2, which has the same refractive index as that of the common cladding 4, and a trench layer 3, which has a refractive index lower than that of the common cladding 4 at this point, are sequentially provided on an outer periphery of the outermost core 1. FIG. 2 shows the relations of refractive-index distributions of the outermost core 1 and the coating 5, specifically, the refractive-index distributions of peripheral regions of the outermost core 1 and the coating 5 corresponding to the configuration shown in FIG. 1A. The outermost core 1 and the coating 5 are separated from each other via the common cladding 4, and, particularly, the outermost core 1 and the common cladding 4 are separated from each other via the internal cladding 2 and the trench layer 3. As can be seen from FIG. 2, the refractive index of the coating is a high refractive index compared with the refractive index of the outermost core 1; and, when part of the light subjected to wave-guiding through the outermost core 1 (core-mode light) reaches the coating 5, the reached light is coupled to the coating 5.

FIG. 3 is a graph showing relations between OCT of MCF and leakage losses LL. A vertical axis of FIG. 3 is shown by logarithmic display. It is known that increases in transmission losses of the outermost cores due to LL are exponentially increased when OCT is reduced. In order to suppress deterioration of signal-to-noise ratios (S/N ratios) due to transmission loss deterioration as much as possible, it is desired to reduce the leakage loss to an ignorable level. Non-Patent Documents 1 to 3 explicitly or implicitly state that, at a wavelength of 1625 nm, LL of the outermost core be suppressed to 0.001 dB/km.

CITATION LIST

Non-Patent Literature

Non Patent Document 1: T. Hayashi, T. Taru, O. Shimakawa, T. Sasaki, and E. Sasaoka, "Design and fabrication of ultra-low crosstalk and low-loss multi-core fiber", Opt. Express, vol. 19, no. 17, pp. 16576-16592, August 2011

Non-Patent Document 2: K. Takenaga, Y. Arakawa, Y. Sasaki, S. Tanigawa, S. Matsuo, K. Saitoh, and M. Koshiba, "A Large Effective Area Multi-Core Fibre with an Optimised Cladding Thickness," in Eur. Conf. Opt. Commun. (ECOC), 2011, p. Mo.1.LeCervin.2

Non-Patent Document 3: K. Takenaga, Y. Arakawa, Y. Sasaki, S. Tanigawa, S. Matsuo, K. Saitoh, and M. Koshiba, "A large effective area multi-core fiber with an optimized cladding thickness", Opt. Express, vol. 19, no. 26, pp. B543-B550, November 2011

SUMMARY OF INVENTION

Technical Problem

The present inventors studied conventional leakage loss measurement methods and, as a result, found out following problems.

Namely, to the knowledge of the inventors, there has been no method that directly measures the leakage loss from the outermost core to the coating. In Non-Patent Documents 2 and 3, in a MCF 10A having a structure having a central core 11 at a center (matching a fiber central axis AX of MCF 10A) of a common cladding 4 shown in FIG. 1B, an excess loss is calculated as LL from the difference between the transmission loss of the central core 11 and each of the transmission losses of the outermost cores 1, which are annularly disposed. Note that, also in this example of FIG. 1B, the outer periphery of the common cladding 4 is provided with the coating 5 (high-refractive-index resin) having a refractive index higher than that of the common cladding 4, and, as options, each of the outer periphery of the central core 11 and the outer peripheries of the outermost cores 1 is provided with the internal cladding 2 and the trench layer 3. However, by such a method, the measurement cannot be carried out in the MCF 10 having the structure without the central core 11 like FIG. 1A.

Meanwhile, if the structures of the central core 11 and the outermost cores 1 are different, they cannot be judged simply by the differences between the transmission losses of both of the cores. Even if the cores have the same kind of structures, individual cores have subtle differences in transmission losses, and the differences in the transmission losses between the cores cause reduction in measurement precision.

The present embodiment has been accomplished in order to solve the above described problems, and it is an object to provide a measurement method in which the leakage loss LL of an optical fiber having a core and a cladding both comprised of silica-based glass and having a high-refractive-index resin coating on the cladding is directly measured.

Solution to Problem

In a method for measuring a leakage loss of an optical fiber according to the present embodiment, a leakage loss of a multi-core optical fiber (MCF) having a glass region covered with a resin coating, specifically, the leakage loss from a peripheral core to the coating is measured. The MCF serving as a measurement target is provided with: a plurality of cores comprised of silica-based glass; a common cladding having a lower refractive index than each of the plurality of cores, surrounding respective outer peripheries of the plurality of cores, and comprised of silica-based glass; and a resin coating provided on an outer periphery of the common cladding and having a higher refractive index than the common cladding. Moreover, the method comprises with a first measurement step, and a second measurement step. The first measurement step includes: inputting measurement light from one end of a peripheral core among the plurality of cores of the MCF in a high refractive-index state in which the MCF is provide the resin coating; receiving the measurement light outputted from the other end of the peripheral core; and measuring first transmission power of the measurement light propagated through the peripheral core. The second measurement step includes: after the measurement of the first transmission power, the second measurement step, providing a low-refractive-index layer having a lower refractive index than the common cladding onto the outer periphery of the common cladding instead of all of the resin coating or part of a predetermined zone of the resin coating to set the MCF to a the low-refractive-index state; inputting the measurement light from the one end of the peripheral core of the MCF in the low refractive-index state; receiving the measurement light outputted from the other end of the peripheral core; measuring second transmission power of the measurement light propagated through the peripheral core; and calculating a power difference between the first transmission power and the second transmission power of the measurement light.

Advantageous Effects of Invention

According to the present embodiment, the leakage loss LL can be directly measured regardless of a core arrangement of the MCF and regardless of differences in core structures and variations in structure parameters.

DESCRIPTION OF EMBODIMENTS

Figure 1:
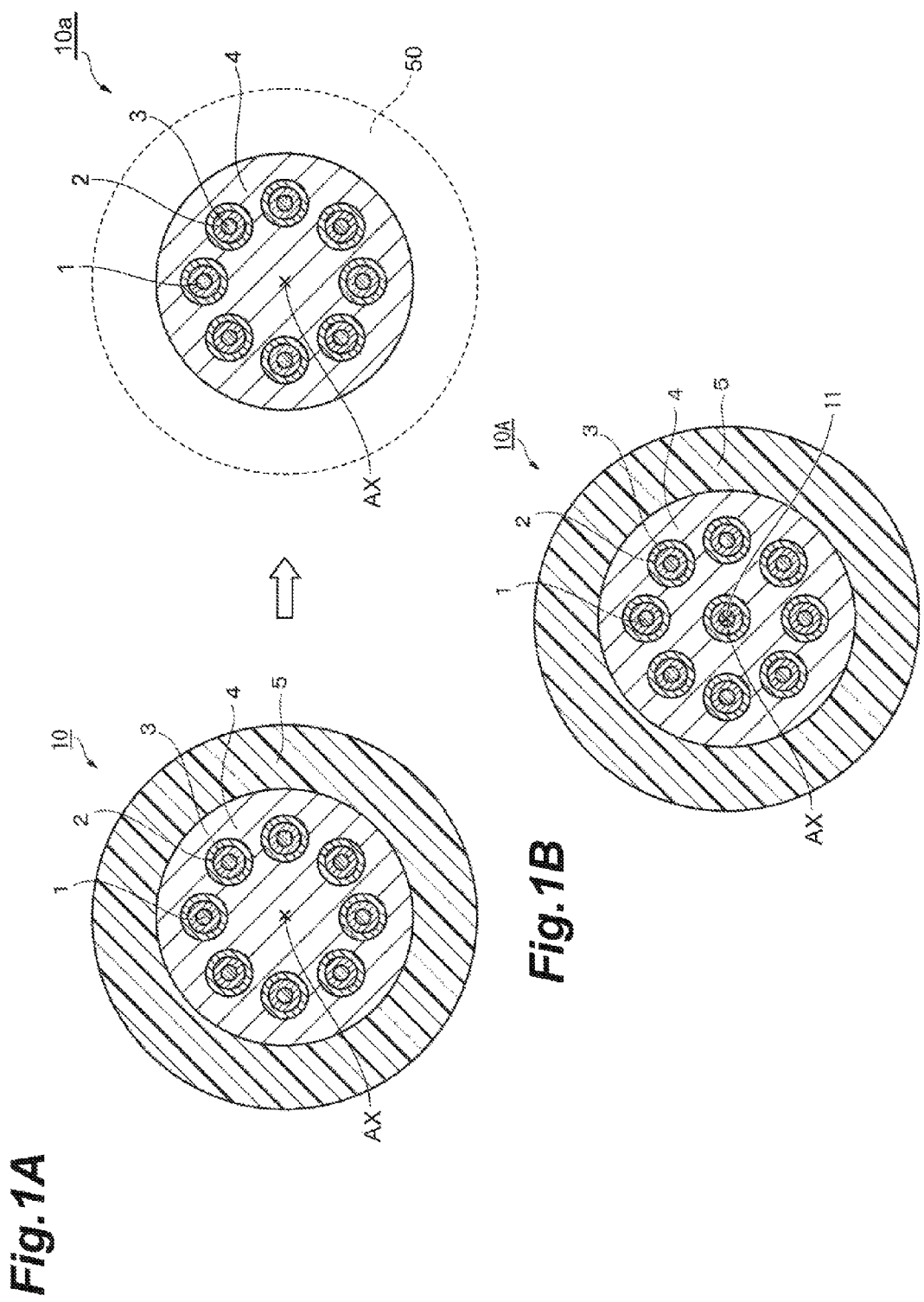
FIGS. 1A and 1B are views for describing cross-sectional structures of MCF.
Figure 2:
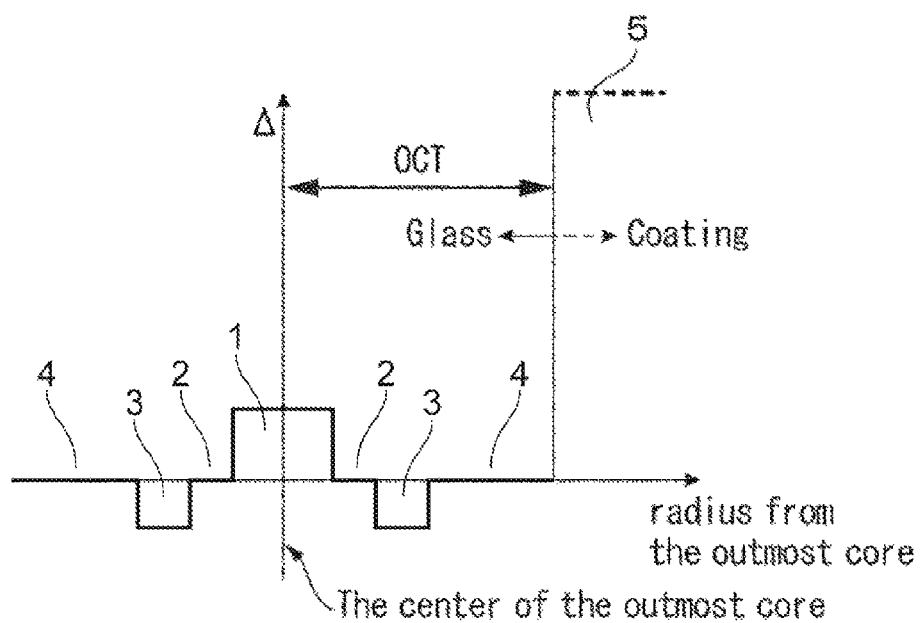
FIG. 2 is a diagram for describing OCT.
Figure 3:
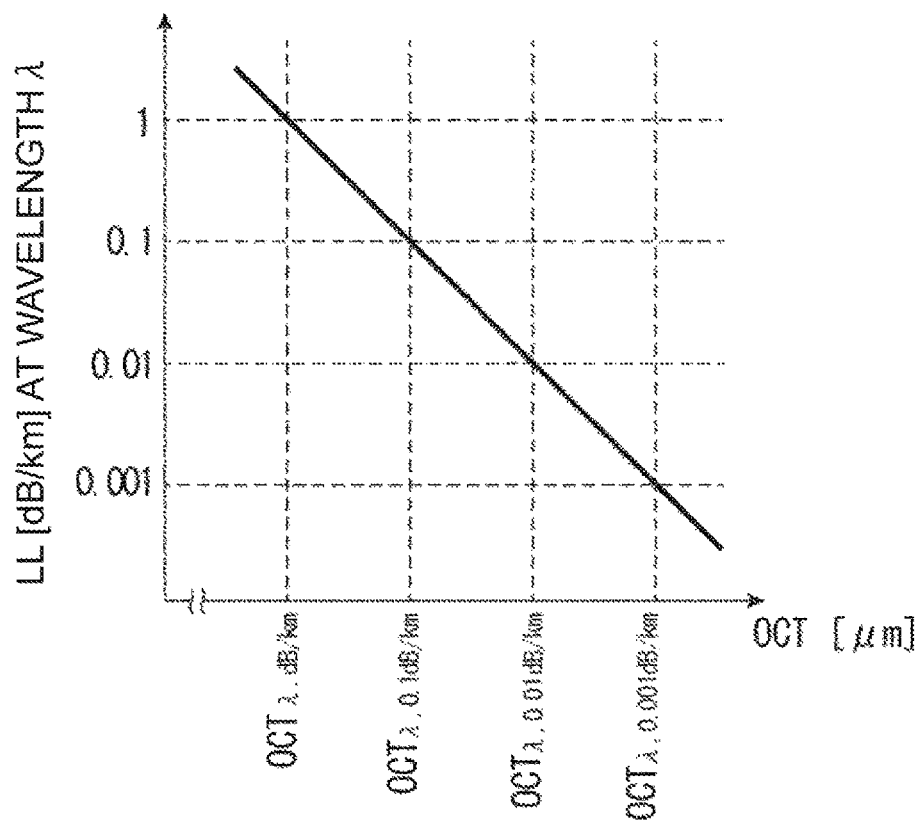
FIG. 3 is a diagram for describing relations between OCT and leakage losses LL.

Description of Embodiment of Invention of Present Application

First, contents of an embodiment of the invention of the present application will be individually listed and described.

(1) As an aspect of the present embodiment, a MCF serving as a measurement target is provided with: a plurality of cores comprised of silica-based glass; a common cladding having a lower refractive index than each of the plurality of cores, surrounding respective outer peripheries of the plurality of cores, and comprised of silica-based glass; and a resin coating provided on an outer periphery of the common cladding and having a higher refractive index than the common cladding. Moreover, the measurement method comprises a first measurement step, and a second measurement step. The first measurement step includes: inputting measurement light from one end of a peripheral core among the plurality of cores of the MCF in a high refractive-index state in which the MCF is provided with the resin coating; receiving the measurement light outputted from the other end of the peripheral core; and measuring first transmission power of the measurement light propagated through the peripheral core. The second measurement step includes: after the measurement of the first transmission power, providing a low-refractive-index layer having a lower refractive index than the common cladding onto the outer periphery of the common cladding instead of all of the resin coating or part of a predetermined zone of the resin coating (at least equal to or more than half of the resin coating); inputting the measurement light from the one end of the peripheral core of the MCF in the low refractive-index state; receiving the measurement light outputted from the other end of the peripheral core; measuring second transmission power of the measurement light propagated through the peripheral core; and calculating a power difference between the first transmission power and the second transmission power of the measurement light.

Note that the plurality of cores are disposed in a region completely surrounded by the outer periphery of the common cladding, which defines the cross-sectional shape of the common cladding, in a plane orthogonal to a longitudinal direction of the MCF. The MCF serving as the measurement target may be part cut out from a MCF product separately manufactured and having a predetermined length. In this case, based on the measurement results of the cutout MCF, the MCF product per se can be evaluated. The peripheral core may strictly be an outermost core, but may be one of the cores designed to be disposed on the same circumference. Moreover, in the present description, the low-refractive-index layer may be a layer having a low refractive index practically equal to or less than an equivalent level of the refractive index of the common cladding. For example, the low-refractive-index layer may be an air layer, liquid having a low refractive index, or a coating infiltrated with the liquid having a low refractive index so that the low-refractive-index layer as a whole is realized.

(2) As an aspect of the present embodiment, the low-refractive-index layer may be an air layer. As an aspect of the present embodiment, the air layer may be a region surrounding the outer periphery of the common cladding from which the resin coating is removed. As an aspect of the present embodiment, the low-refractive-index layer may be at least one of liquid and a layer constituted by the resin coating infiltrated with the liquid. As an aspect of the present embodiment, the liquid is preferred to have a lower refractive index than the common cladding.

(3) As an aspect of the present embodiment, first, a first power difference between the first and second transmission powers is obtained by performing the first and second measurement steps while setting, as a wavelength of the measurement light, a first wavelength included in a long wavelength region of a measurement wavelength range. Second, a second power difference between the first and second transmission powers is obtained by performing the first and second measurement steps while setting, as the wavelength of the measurement light, a second wavelength included in the long wavelength region and in a shorter wavelength side than the first wavelength. After obtaining the first and second power differences, the method further comprises: calculating a wavelength dependency of power difference in the long wavelength region, from the obtained first and second power differences at the first and second wavelengths; and calculating a power difference at a third wavelength from the wavelength dependency of the power differences in the long wavelength region, the third wavelength being included in the measurement wavelength region and in the shorter wavelength side than the long wavelength region.

Hereinabove, each of the aspects listed in the section of this [Description of Embodiment of Invention of Present Application] may be applied to each of the rest of all the aspects or to all combinations of these rest of the aspects.

Details of Embodiment of Invention of Present Application

Hereinafter, a specific structure of a leakage loss measurement method for an optical fiber according to the present embodiment will be described in detail with reference to accompanying drawings. Note that the present invention is not limited by these examples, but is represented by claims and is intended to include the meanings equivalent to claims and all changes within the scope thereof. Meanwhile, the same elements in the description of drawings are denoted by the same reference signs, and redundant descriptions will be omitted.

Figure 4A:
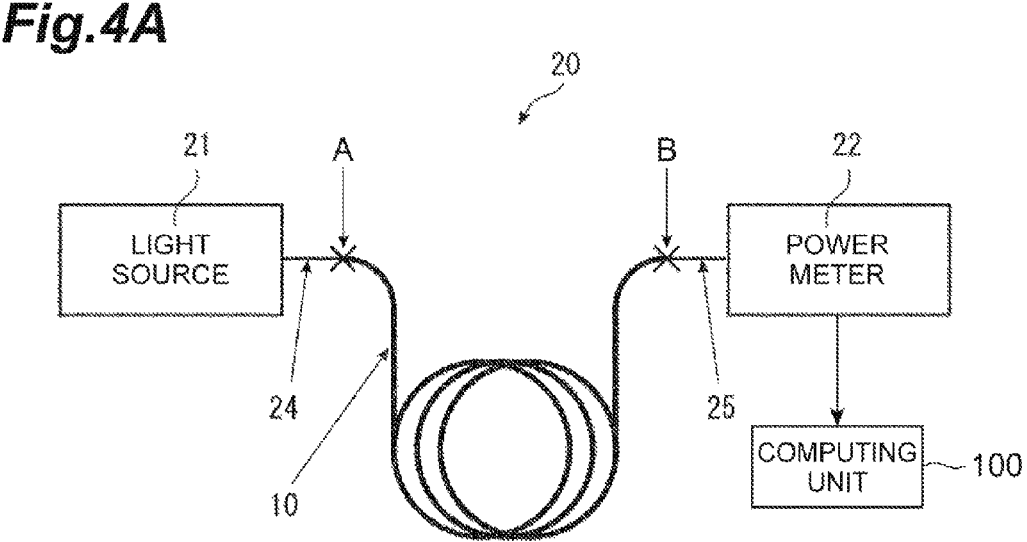
FIGS. 4A and 4B are views showing a measurement system in a first state (high refractive-index state) and the measurement system in a second state (low refractive-index state) as configurations for carrying out part of steps included in a leakage loss measurement method according to the present embodiment.
Figure 4B:
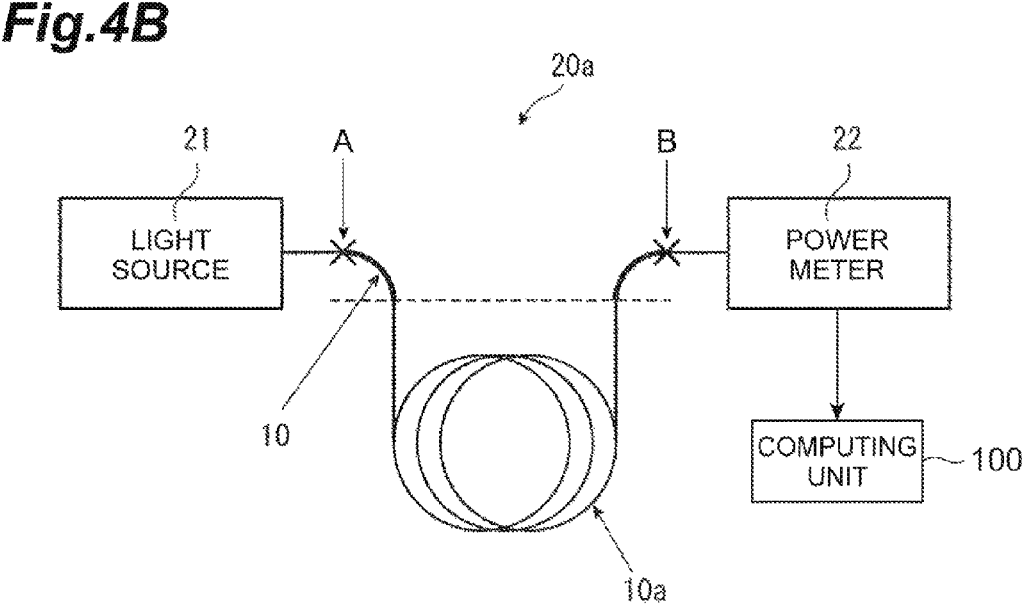

FIGS. 4A and 4B are views showing a measurement system of leakage loss measurement according to an embodiment of the present invention. Specifically, FIG. 4A shows a measurement system 20, which measures first transmission power of MCF in a first state (high refractive-index state) in which a coating is still remaining thereon. In the measurement system 20, a MCF 10 serving as a measurement target has a cross-sectional structure shown in the left side of FIG. 1A, a light-input optical fiber 24 is connected to one end of the MCF 10, and a light-receiving optical fiber 25 is connected to the other end of the MCF 10.

A light source 21 is connected to a light-input end of the light-input optical fiber 24, and measurement light having a predetermined wavelength is inputted from the light source 21 to each one of outermost cores 1 of the MCF 10 via the light-input optical fiber 24. A power meter 22 serving as a measurement light receiver is connected to an output end of the light-receiving optical fiber 25, and first transmission power is measured by receiving output light from the light-receiving optical fiber 25 (measurement light propagated through one of the outermost cores 1) by the power meter 22 (first measurement step). The first transmission power measured by the power meter 22 is transmitted to a computing unit 100 as an electric signal. Note that, if the leakage loss of each of a plurality of wavelengths is to be measured, the first measurement step is repeated for each of the wavelengths. Similarly, a later-described second measurement step is also repeated for each of the wavelengths, and a later-described first calculation step is also repeated for each of the wavelengths.

FIG. 4B shows a measurement system 20a, which measures second transmission power of the MCF in a second state (low refractive-index state) in which most of the coating is removed. In the measurement system 20a, a MCF 10a which is a measurement target has a cross-sectional structure shown in the right side of FIG. 1A. More specifically, a glass region (outermost cores 1, an internal cladding 2, trench layers 3, and a common cladding 4) has the same cross-sectional structure as that of the MCF 10 (the left side of FIG. 1A). On the other hand, the MCF 10a is different from the MCF 10, which is in the first state, in a point that the outer periphery of the common cladding 4 is covered with a low-refractive-index layer 50 instead of a coating 5. More specifically, the MCF 10a is different from the MCF 10 of FIG. 4A in a point that the coating 5 is removed or the outer periphery of the common cladding 4 is in a low refractive-index state in the part except for both ends thereof. In the second measurement step, the second transmission power of the MCF 10a in this low refractive-index state is measured. Specifically, in the second measurement step, measurement light with the same wavelength as that of the first measurement step is inputted from the light source 21 to one of the outermost cores 1 of the MCF 10a via the light-input optical fiber 24. The second transmission power is measured by receiving the measurement light, which has propagated through this outermost core 1, by the power meter 22 via the light-receiving optical fiber 25. Note that the coating at the both ends of the MCF 10a is not necessarily required and the coating may not be present. The measured second transmission power is also transmitted from the power meter 22 to the computing unit 100 as an electric signal, and, in the computing unit 100, the difference between the first transmission power measured in the first measurement step and the second transmission power is divided by the length of the MCF in the low refractive-index state, thereby calculating a leakage loss LL per a unit length (first calculation step).

As an example of the MCF 10a in the second state, the low-refractive-index layer 50 provided on the outer periphery of the common cladding 4 can be formed by an air layer by burning the coating 5 of the MCF 10. Note that, if cinders of coating resin remains on the outer periphery of the common cladding 4, a measure such as removal of the cinders with a solvent is carried out.

Figure 5:
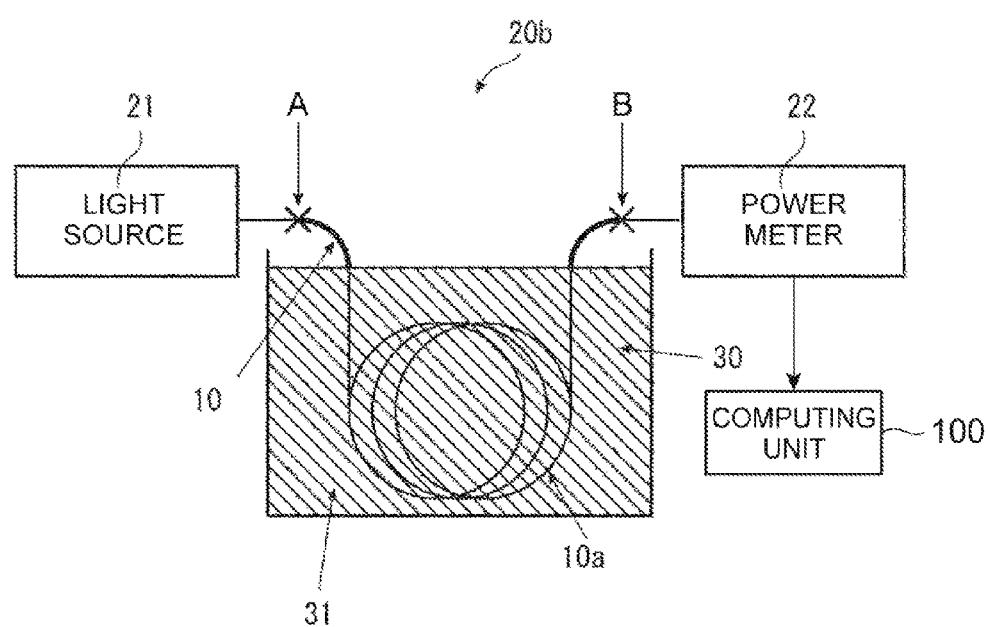
FIG. 5 is a view for describing the measurement system in the second state.

Meanwhile, as another example of the MCF 10a in the second state, as shown in FIG. 5, the part which is in the second state is housed in a container 30. More specifically, in a measurement system 20b of FIG. 5, liquid (water, a solution (including an aqueous solution), or a solvent) which infiltrates into, dissolves, or decomposes the coating 5 for the MCF 10 is in a container. Note that, excluding the MCF 10a in the second state, regarding the other configurations, the measurement system 20b has the same configurations as the measurement systems 20 and 20a shown in FIG. 4A and FIG. 4B. The liquid may be liquid containing an organic substance and is not restricted to be acid, neutral, or alkaline. In a case in which the liquid infiltrates into the coating 5 or, more preferably, peels off the coating, the liquid has a low refractive index, the refractive index as a whole in the state in which the liquid has infiltrated into the coating 5 is lower than that of the common cladding 4, and propagation of leakage light into the coating 5 is low. The case in which the coating is dissolved or decomposed is similar to that; the liquid is only required to be acidic liquid and have a low refractive index like a sulfuric acid liquid (the refractive index at a temperature of 300 K is lower than the refractive index of silica glass in the range of wavelengths 1.17 µm to 2.00 µm) or the like. Note that sulfuric acid liquid is preferred also in a point that measurement can be carried out without equipment such as an air exhaust draft since sulfuric acid is not easily vaporized. Meanwhile, if there is not the coating 5, the outer periphery of the common cladding 4 is only required to have some sort of liquid 31 having a low refractive index as the low-refractive-index layer 50.

Figure 6:
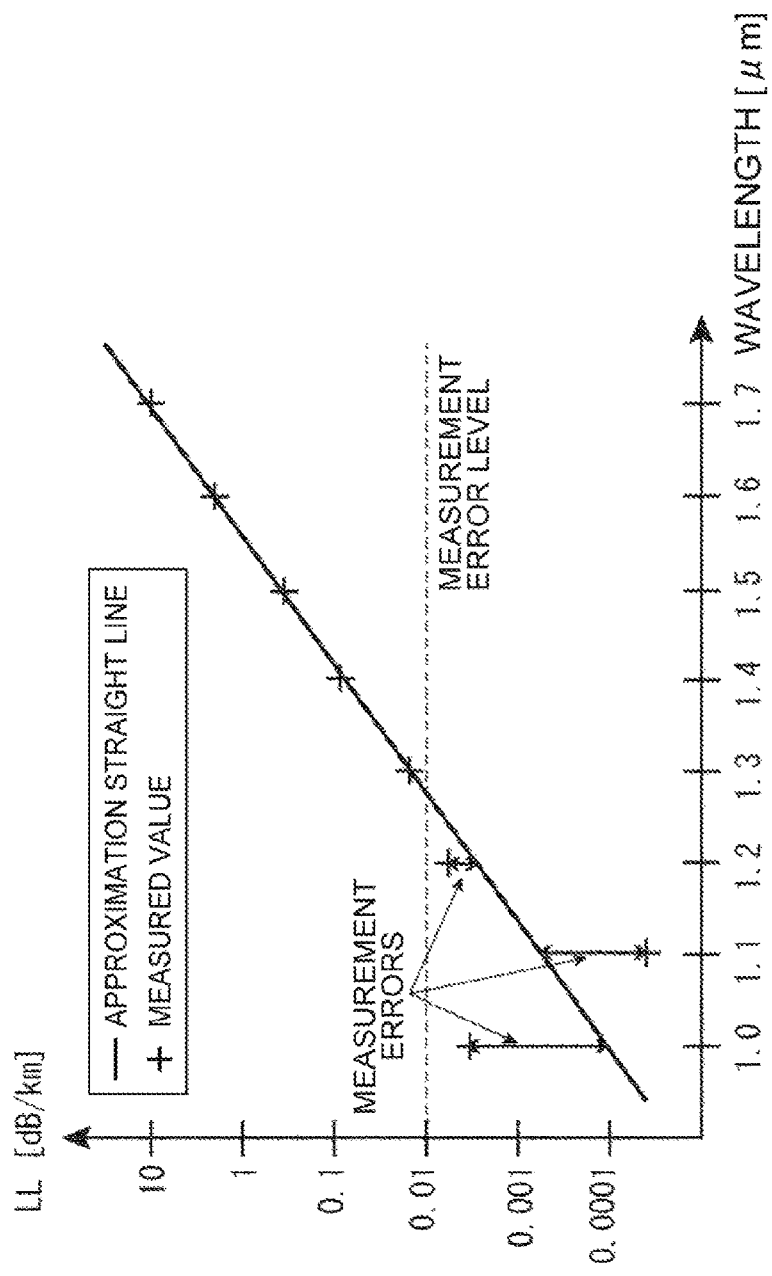
FIG. 6 is a diagram for describing relations between wavelength dependency of leakage losses and measured values.

FIG. 6 is a diagram describing relations between wavelength dependency of leakage losses LL and measured values of the present invention. The leakage losses LL in a wavelength range of wavelengths of 1.0 to 1.7 µm can be measured by using a multi-wavelength light source or a wide-wavelength-range light source as the light source 21 and using a wide-wavelength-range spectrometer as the power meter (light receiver) 22 in FIGS. 4A, 4B and 5. However, since LL is exponentially increased as the wavelength is increased, measurement precision of LL is reduced in the short wavelength side. In the example of FIG. 6, for example in a measurement wavelength range of wavelengths of 1.0 to 1.7 µm, measurement errors occurred in a short wavelength region in which LL is 0.01 dB/km or less. In this case, in a case of a long wavelength region of wavelengths of about 1.3 µm or more, the rate of measurement errors with respect to the measured values of LL is low, and approximately precise values can be measured. On the other hand, in a short wavelength region of wavelengths smaller than 1.3 µm, the rate of measurement errors with respect to the measured values of LL is high, and precise values cannot be obtained. Therefore, in the case of LL measurement in the short wavelength region in which measurement errors occur, the computing unit 100 utilizes wavelength characteristics of LL in the long wavelength region and calculates LL at each wavelength of the short wavelength region (second calculation step). Specifically, the wavelength dependency of LL in a long wavelength region is calculated from measurement results (LL measured values of at least two wavelengths included in the long wavelength region) in the long wavelength region (for example, wavelengths of 1.3 to 1.7 µm in the case of FIG. 6) in which LL is somewhat large. More specifically, calculations of smaller LL (indirect measurement of LL) in a short wavelength region (the wavelength region of a wavelength of 1.2 µm or less in the example of FIG. 6) can be carried out by carrying out extrapolation (for example, carried out by, for example, subjecting the relations between logarithms and wavelengths of LL to linear approximation or polynomial approximation) with respect to the measurement results, which show the relations between a plurality of sets of wavelengths and LL. As a result, LL of the MCF can be precisely evaluated while the influence of the measurement errors is eliminated more than the case in which LL is directly measured in the short wavelength region. Note that, in FIG. 6, symbols "+" represent measured values of LL, a solid line represents an approximation straight line, and the distance between the measured value at each wavelength and the approximation straight line is a measurement error. Meanwhile, in the example of FIG. 6, at which the measurement error occurs at the LL measured value of 0.01 dB/km or less.

By using the measurement method of the present embodiment, the leakage losses LL can be actually measured. Since the leakage losses can be precisely measured, OCT can be reduced as much as possible, and designing of a low-loss high-core-density MCF is enabled. Note that the diameter of the common cladding of the MCF is preferred to be 125 µm to 400 µm for reasons that microbending losses can be suppressed since the glass diameter is not to small and that mechanical reliability can be enhanced by suppressing a fracture probability since the glass diameter is not too large. In addition to this, it is further preferred that the diameter of the cladding of the MCF be 130 µm or more or 250 µm or less.

REFERENCE SIGNS LIST

1: outermost core (peripheral core); 2: internal cladding; 3: trench layer; 4: common cladding; 5: coating; 10, 10a: MCF; 11: central core; 20, 20a, 20b: measurement system; 21: light source; 22: power meter; 24: light-input fiber; 25: light-receiving fiber; 30: container; 31: solution/solvent; and 100: computing unit.

The invention claimed is:

1. A method for measuring a leakage loss in a multi-core optical fiber having a plurality of cores comprised of silica-based glass, a common cladding comprised of silica-based glass, and a resin coating, the common cladding having a lower refractive index than each of the plurality of cores and surrounding respective outer peripheries of the plurality of cores, the resin coating being provided on an outer periphery of the common cladding and having a higher refractive index than the common cladding, the method comprising:

a first measurement step including:
  inputting measurement light from one end of a peripheral core, among the plurality of cores of the multi-core optical fiber in a high refractive-index state in which the multi-core optical fiber is provided with the resin coating;
  receiving the measurement light outputted from the other end of the peripheral core; and
  measuring first transmission power of the measurement light propagated through the peripheral core; and a second measurement step including:
  after the measurement of the first transmission power, providing a low-refractive-index layer having a lower refractive index than the common cladding onto the outer periphery of the common cladding instead of all of the resin coating or part of a predetermined zone of the resin coating to set the multi-core optical fiber to a low-refractive-index state;
  inputting the measurement light from the one end of the peripheral core of the multi-core optical fiber in the low refractive-index state;
  receiving the measurement light outputted from the other end of the peripheral core;

measuring second transmission power of the measurement light propagated through the peripheral core; and calculating, as the leakage loss, a power difference between the first transmission power and the second transmission power of the measurement light.

2. The method according to claim 1, wherein a first power difference between the first and second transmission powers is obtained by performing the first and second measurement steps while setting, as a wavelength of the measurement light, a first wavelength included in a long wavelength region of a measurement wavelength range, wherein a second power difference between the first and second transmission powers is obtained by performing the first and second measurement steps while setting, as the wavelength of the measurement light, a second wavelength included in the long wavelength region and in a shorter wavelength side than the first wavelength, and wherein the method further comprising:

calculating a wavelength dependency of power difference in the long wavelength region, from the obtained first and second power differences at the first and second wavelengths; and calculating a power difference at a third wavelength from the wavelength dependency of the power differences in the long wavelength region, the third wavelength being included in the measurement wavelength region and in the shorter wavelength side than the long wavelength region.

3. The method according to claim 1, wherein the low-refractive-index layer is an air layer.

4. The method according to claim 1, wherein the low-refractive-index layer is at least one of liquid and a layer constituted by the resin coating infiltrated with the liquid.

5. The method according to claim 3, wherein the air layer is a region surrounding the outer periphery of the common cladding from which the resin coating is removed.

6. The method according to claim 4, wherein the liquid has a lower refractive index than the common cladding.

* * * * *